(12) United States Patent
Busch et al.

(10) Patent No.: US 10,148,144 B2
(45) Date of Patent: Dec. 4, 2018

(54) LOW-PROFILE, DISK-SHAPED DRIVE UNIT FOR A REVOLVING DOOR

(71) Applicant: DORMA DEUTSCHLAND GMBH, Ennepetal (DE)

(72) Inventors: Sven Busch, Dortmund (DE); Stefan Kissler, Leverkusen (DE); Thomas Schmitz, Wesseling (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 828 days.

(21) Appl. No.: 14/154,423

(22) Filed: Jan. 14, 2014

(65) Prior Publication Data

US 2014/0197718 A1    Jul. 17, 2014

(30) Foreign Application Priority Data

Jan. 14, 2013  (DE) .................. 10 2013 000 421

(51) Int. Cl.
 *H02K 1/27* (2006.01)
 *E05F 15/608* (2015.01)
 *H02K 11/30* (2016.01)
 *E05D 15/02* (2006.01)

(52) U.S. Cl.
 CPC ......... *H02K 1/2786* (2013.01); *E05F 15/608* (2015.01); *H02K 11/30* (2016.01); *E05D 15/02* (2013.01); *E05Y 2800/106* (2013.01); *E05Y 2900/132* (2013.01)

(58) Field of Classification Search
 CPC . H02K 1/14; H02K 1/27; H02K 11/00; H02K 1/2786; H02K 11/30; E05F 5/63; E05F 15/608; E06B 3/90; E05Y 2900/132; E05Y 2800/106; E05D 15/02

USPC ..... 310/216.023, 236, 254.1, 265, 267, 268, 310/406

See application file for complete search history.

(56) References Cited

U.S. PATENT DOCUMENTS

| | | | |
|---|---|---|---|
| 4,763,053 A * | 8/1988 | Rabe ...................... | G11B 15/26 310/180 |
| 2007/0063595 A1 | 3/2007 | Habibi et al. | |
| 2008/0084126 A1* | 4/2008 | Lee ........................ | D06F 37/304 310/43 |

(Continued)

FOREIGN PATENT DOCUMENTS

| | | | | |
|---|---|---|---|---|
| DE | 10259426 A1 * | 6/2004 | .......... | H02K 5/1735 |
| DE | 102004033304 A1 | 2/2006 | | |
| DE | 102007030508 A1 | 1/2009 | | |

(Continued)

OTHER PUBLICATIONS

Machine Translation DE10259426 (2004).*

*Primary Examiner* — Naishadh Desai
(74) *Attorney, Agent, or Firm* — Cantor Colburn LLP

(57) ABSTRACT

A drive unit for a revolving door with an electronically commutated multipole motor having a quantity of coil elements and a quantity of magnet elements. The multipole motor has a flat base structure and a disk-shaped or cup-shaped stator part arranged at a stationary structural component part. A disk-shaped or cup-shaped rotor part is arranged in a plane-parallel manner with respect to the stator part and can be drivingly connected to a turnstile of the revolving door. The coil elements and the magnet elements are received in an area between the stator part and the rotor part.

15 Claims, 5 Drawing Sheets

(56) References Cited

U.S. PATENT DOCUMENTS

2012/0005961 A1* 1/2012 Busch .................. E05F 15/608
   49/46
2012/0313461 A1* 12/2012 Takeuchi ............... H02K 1/278
   310/43

FOREIGN PATENT DOCUMENTS

| DE | 10 2010 024 108 | 12/2011 |
| EP | 2 072 737 | 6/2009 |
| JP | 711838 A | 1/1995 |
| WO | 2006005438 A1 | 1/2006 |

* cited by examiner

LOW-PROFILE, DISK-SHAPED DRIVE UNIT FOR A REVOLVING DOOR

BACKGROUND OF THE INVENTION

1. Field of the Invention

The present invention is directed to a drive unit for a revolving door with an electronically commutated multipole motor. The multipole motor has a quantity of coil elements, a quantity of magnet elements, and a flat base structure. The invention is further directed to the arrangement of a drive unit of this kind at a revolving door and to a method for the arrangement of the drive unit.

2. Description of the Related Art

DE 10 2010 024 108 A1 shows a generic drive unit for a revolving door with an electronically commutated multipole motor. The multipole motor is flat and has a round base structure. The multipole motor has a rotational axis that coincides with the rotational axis of the turnstile of the revolving door.

Forming a drive unit for a revolving door as an electronically commutated multipole motor allows the drive unit to be integrated into the structure of the revolving door in a particularly advantageous manner. For example, the drive unit can be mounted on the floor side, and there is no need for a large space in the shell structure of a building for receiving the drive unit. The flat construction of the drive unit results particularly from the fact that the electronically commutated multipole motor can be connected directly to the turnstile of the revolving door so that the drive unit need not have a gear unit. However, electronically commutated multipole motors have output shafts for transmitting rotational movement of the output shaft to the components arranged that are to be driven, for example, the turnstile of a revolving door.

EP 2 072 737 A2 shows another drive unit for a revolving door comprising a gear unit which couples a motor to the turnstile of a revolving door. An output shaft is used between the gear unit and the turnstile and acts on the turnstile which is rotatably mounted between two bearings. The output shaft coincides with the axis of rotation of the turnstile so that the gear unit in operative connection to the output shaft increases the overall height of the drive unit.

Newer revolving doors require drive units having a very flat design. The use of a gear unit in connection with an output shaft already causes a considerable increase in the height of the drive unit in direction of the rotational axis of the turnstile, particularly in floor-mounted drive units. However, in ceiling-mounted drive units, large heights often lead to structural and cosmetic disadvantages, for example, when the revolving door is installed in the facade of a building.

SUMMARY OF THE INVENTION

It is an object of one embodiment of the invention to provide a drive unit for a revolving door, an arrangement of a drive unit in a revolving door, and a revolving door with a drive unit of this kind which has a low height and is constructed in a simple manner. In particular, the object of one embodiment of the invention is to further develop a drive unit with an electronically commutated multipole motor such that the arrangement of the multipole motor in the revolving door, and particularly at the turnstile, can be carried out in a simplified manner.

One embodiment of the invention is a drive unit for a revolving door with an electronically commutated multipole motor having a quantity of coil elements and a quantity of magnet elements. The multipole motor has a flat base structure and a disk-shaped or cup-shaped stator part arranged at a stationary structural component part, and a disk-shaped or cup-shaped rotor part arranged in a plane-parallel manner with respect to the stator part that can be drivingly connected to a turnstile of the revolving door. The coil elements and the magnet elements are received in the area between the stator part and the rotor part.

One embodiment of invention is based on gearlessly connecting the electronically commutated multipole motor to the turnstile of the revolving door and arranging the stator part in a simple manner at a stationary structural component part, particularly of the revolving door but also, for example, at the facade in which the revolving door is installed. The rotor part can be directly connected to the turnstile of the revolving door in a simple manner so that the turnstile is bearing-mounted. This is made possible in that the electronically commutated multipole motor is constructed according to the invention substantially from two disk-shaped or cup-shaped parts, and the coil elements and magnet elements are arranged between the disk-shaped or cup-shaped parts. At the same time, the stator part and the rotor part together form the housing of the multipole motor. In this way in particular, the electronically commutated multipole motor can be constructed so as to be especially flat, the disk-shaped or cup-shaped parts of the stator part and of the rotor part need not necessarily have the same diameter, and the parts can radially overlap with respect to one another. As a result of the disk-shaped base structure of the multipole motor, a kind of rotary disk is formed, which can be arranged in an advantageous manner between the structural component part and the turnstile of the revolving door. The structural component part can be provided at the ceiling side or at the floor side of the turnstile so that the multipole motor can be arranged at the ceiling side as well as at the floor side in or at the revolving door. A special advantage is afforded in particular by the disk-shaped or cup-shaped construction of the rotor part in that the latter can be arranged relative to the turnstile without further constructional steps such that the rotational axis of the turnstile forms an orthogonal to the extension plane of the disk-shaped or cup-shaped rotor part, and the rotational axis of the rotor part can coincide with the rotational axis of the turnstile.

Multipole motors are also known as torque motors and have coil elements arranged on a circular path and which are in oppositely facing relationship, for example, on the inner side, outer side, or axially, to magnet elements arranged on a circular path, so that a high-pole count, high-torque direct drive is formed.

In a particularly advantageous manner, the ratio of height to diameter of the substantially round, flat base structure of the electronically commutated multipole motor can be at least 1:3, preferably at least 1:4, particularly preferably at least 1:5, and most preferably 1:8 or more. The ratio of height to diameter is given by the parallel spacing of the disk-shaped or cup-shaped stator part in relation to the disk-shaped or cup-shaped rotor part of the multipole motor to the diameter of the stator part and/or rotor part. The ratios of height to diameter of up to 1:8 or more can only be achieved in that the coil elements and magnet elements are arranged between the stator part and rotor part, and it has been shown that even base structures of multipole motors reaching a ratio of height to diameter of more than 1:12 can be used as drives for revolving doors.

The flat, disk-shaped constructional form of the multipole motor has the positive effect that a high torque, which is also necessary for the operation of a revolving door, can be achieved because the circumferential air gap radius between the coil elements and the magnet elements can be very large particularly when the multipole motor is constructed as an external rotor.

A disk-shaped configuration is a flat cylinder in which the diameter is many times greater than the height. For example, the multipole motor can have a diameter of approximately 500 mm and a height of only about 40 mm. Further, the characterizing feature of a disk-shaped configuration also applies when a multipole motor with a primarily disk-shaped configuration is intentionally changed to another similar shape. For example, a flat, polygonal frustum can surround the stator part or rotor part, which are round per se, or, for example, the stator part or the rotor part has a shape which is not round and which deviates from a dish shape, for example, a flat cube. A reshaping of this kind can be carried out by enclosing the rotor part or stator part with a correspondingly shaped housing or by reshaping the coil cores in a corresponding manner.

A further special advantage of the drive unit according to one embodiment of the invention is achieved in that a control unit of the multipole motor can also be received between the stator part and the rotor part. The control unit can be designed for providing power, for commutation, and for controlling the basic operation of the multipole motor, but also for signal processing for controlling the multipole motor, for example, for a start/stop function, an emergency cutoff function or for monitoring the rotation of the turnstile of the revolving door. By integrating the control unit of the multipole motor in the space between the stator part and the rotor part, there results a connection-ready, module-like drive unit that need only be connected to a power supply and to signal terminals, e.g., for an interface module for external control of the drive unit.

Another considerable advantage is achieved in that the rotor part is bearing-mounted at the stator part so as to be rotatable particularly around an imaginary drive axis. In so doing, at least one bearing, particularly at least one axial bearing and/or at least one radial bearing can be arranged between the stator part and the rotor part. The stator part is rigidly arranged at the structural component part, which can be a component part of the revolving door, for example, of the frame of the revolving door, but can also be a component part of the overall facade of a building. The rotor part can be rotatably received at this stationary stator part via a bearing arrangement, and the turnstile of the revolving door can be connected to the rotor part. The use of an axial bearing achieves the special advantage that forces can be transmitted from the structural component part to the turnstile and, for example, the structural component part can be a component part of the upper frame construction of the revolving door supported by the axial bearing on the turnstile without the rotatability of the turnstile being impeded by the load supported by the multipole motor. Consequently, in particular the axial bearing can have increased dimensions and the frame construction of the revolving door can be designed to take into account a transmission of force through the turnstile and multipole motor in direction of the rotational axis of the turnstile, which coincides with the drive axis of the multipole motor. The turnstile can have two, three, four or more revolving wings and need not necessarily have the basic shape of a cross.

According to a further advantageous embodiment form of the drive unit, the coil elements can be arranged on the radially inner side relative to the magnet elements. The coil elements can have wound bodies arranged at the stator part in such a way that they are oriented so as to be substantially radially extending between the stator part and the rotor part. When the magnet elements are arranged on the radially outer side relative to the coil elements, this results in an advantageous particularly high-torque design of the multipole motor which accordingly forms an external rotor. This is due in particular to the fact that the magnet gap between the magnet elements and the coil elements is at a greater distance from the drive axis of the drive unit. Due to the fact that the magnet elements have smaller dimensions than the coil elements, the air gap between the coil elements and the magnet elements can be situated farther outward in relation to the drive axis in that the magnet elements are arranged on the outer side relative to the coil elements so that the air gap radius is increased.

The coil elements can be arranged in a stationary manner at the stator part, and the rotor part can have a cup shape with a cup surface portion which substantially laterally covers the disk-shaped stator part or surrounds the latter. The magnet elements can be arranged on the inner side in the cup surface portion. The coil elements are arranged at the stator part. If the rotor part and the stator part are mounted so as to be spaced apart parallel to one another, the coil elements and the magnet elements can be in oppositely facing relationship in radial direction.

The stator part can be arranged in a stationary manner at the structural component part, and the rotor part can be formed for connecting to the turnstile and particularly the revolving wings, and the revolving wings can preferably be connected directly to the outer surface of the rotor part. Particularly when formed in a disk-shaped or cup-shaped manner, the rotor part has a flat, in particular planar, base part having an outer surface facing in direction of the revolving wings of the turnstile. Accordingly, the rotor part can be connected to the turnstile in a particularly simple manner. For example, the revolving wings can be connected, particularly screwed, individually to the rotor part.

Conceivably, the revolving wings can also be initially rigidly connected to one another so as to form a turnstile, and the turnstile is connected to the rotor part. However, it is particularly advantageous to connect the revolving wings individually to the rotor part, and receiving elements, for example, receiving profiles, can be provided by which the revolving wings are connected to the outer side of the rotor part.

According to a further variant, the multipole motor can comprise an output shaft connected to the rotor part in a torsionally rigid manner and which extends in the drive axis in which the turnstile rotates. The turnstile can be connected to the output shaft. In particular, an adapter element can be used for this purpose. The adapter element can be an adapter cross, for example, and the adapter cross forms receiving arms at which individual revolving wings can be arranged.

According to an advantageous further development of the drive unit according to one embodiment of the invention, the multipole motor can have at least one rotary feedthrough by which electronics in the multipole motor, particularly the control unit, can be electrically connected to an element rotating with the rotor part, in particular to the turnstile, by at least one electric lead. The rotary feedthrough can be integrated in the multipole motor in a particularly advantageous manner. The control unit received in the multipole motor is preferably arranged in a stationary manner at the stator part, and the rotary feedthrough can be provided and can be arranged in particular between the rotor part and the stator part in order to provide an electrical connection between the rotating turnstile and the stationary control unit. When the multipole motor has an output shaft, this output shaft can be constructed as a hollow shaft and the rotary feedthrough can be received inside the hollow output shaft or, at least, the electric lead can run through the hollow shaft. The electric leads can be guided in particular through the hollow shaft into the turnstile, and sensors, electric switches, emergency switches or the like can be arranged in the turnstile and electrically connected to the electric control unit even during the rotating movement of the turnstile via the rotary feedthrough located between the stator part and the rotor part.

The electronically commutated multipole motor can be integrated in the floor of the revolving door so that the multipole motor extends jointly at least partially over the height of a screed built upon the shell structure. However, in a particularly advantageous manner the electronically commutated multipole motor can be arranged so as to be visible at the underside of a structural component part located above the turnstile of the revolving door. This visibility applies in particular for persons present within the turnstile. The visible part of the multipole motor is formed particularly by the disk-shaped or cup-shaped rotor part which in a particularly advantageous manner can have a corresponding decorative surface or also an additional bezel element. Another advantage of the visible arrangement of the multipole motor can be achieved in that lighting elements can be integrated in the motor, for example. For example, the disk-shaped or cup-shaped rotor part can be formed at least partially of light-transparent material, and lighting can be arranged between the stator part and the rotor part. It is also conceivable to surround the disk-shaped multipole motor with a luminous border. In a particularly advantageous manner, all lighting can be formed by semiconductor luminous elements.

Finally, the multipole motor can have a position encoder or angle encoder serving for commutation and for determining angular positions and the rotating speed of the turnstile.

The present invention is further directed to an arrangement of a drive unit for a revolving door with an electronically commutated multipole motor having a quantity of coil elements and a quantity of magnet elements. The multipole motor has a flat base structure and a disk-shaped or cup-shaped stator part arranged at a stationary structural component part, and further having a disk-shaped or cup-shaped rotor part which is arranged in a plane-parallel manner with respect to the stator part and which can be drivingly connected to a turnstile of the revolving door. The coil elements and the magnet elements are received in the area between the stator part and the rotor part. A receiving vessel can be provided for arranging the drive unit, and the drive unit can be arranged with the receiving vessel at the structural component part particularly so as to be at least partially recessed therein, the multipole motor being received in the receiving vessel. The receiving vessel can comprise a base area, a lateral surface area and, in particular, a collar area, and the collar area can extend plane-parallel to the base area. The base area need not necessarily have a closed construction, and the receiving vessel can also comprise an open base so that a receiving vessel can be modified to form a receiving ring for receiving the drive unit.

In a further advantageous manner, the drive unit can be integrated in the revolving door on the ceiling side. At least one under ceiling element can be arranged at the underside of the structural component part, this under ceiling element being held at least partially by the receiving vessel, and can serve as a decorative element. In particular when the drive unit is not fully recessed with the receiving vessel in the structural component part, a vertical area between the collar of the receiving vessel and the underside of the structural component part can be formed in which the decorative element is arranged, particularly hung in or inserted.

With the receiving vessel, the drive unit can be mounted directly under the structural component part. The drive unit can also be partially recessed in the structural component part so that the drive unit extends into the structural component part by a part of its height. According to a further variant, the receiving vessel can also be formed in such a way that the drive unit is recessed in the structural component part by its entire height.

The receiving vessel can be used in a particularly advantageous manner also for retrofitting the drive unit in an existing revolving door and for driving the turnstile. In this regard, a conventional drive unit having a motor and a gearbox can be dismantled and the drive unit can be retrofitted in the revolving door by the receiving vessel between the structural component part, for example, the ceiling element of the revolving door, and the turnstile.

One embodiment of the invention is further directed to a revolving door having a drive unit with an electronically commutated multipole motor having a quantity of coil elements and a quantity of magnet elements. The multipole motor has a flat base structure and a disk-shaped or cup-shaped stator part which can be arranged at a stationary structural component part, and further having a disk-shaped or cup-shaped rotor part which is arranged in a plane-parallel manner with respect to the stator part and which can be drivingly connected to a turnstile of the revolving door. The coil elements and the magnet elements are received in the area between the stator part and the rotor part. The further features and accompanying advantages described in connection with the drive unit are likewise taken into account in the same way for the arrangement of the drive unit and for the revolving door.

One embodiment of the invention is further directed to a method for the arrangement of a drive unit. The method comprises at least the steps of providing the drive unit, providing a receiving vessel for receiving the drive unit, and arranging the drive unit at the receiving vessel before or after arranging the receiving vessel at or in a structural component part. In this connection, the step of connecting a turnstile and particularly revolving wings to a rotor part of the multipole motor can be provided in particular.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, further steps improving the invention are explained in more detail in connection with the description of a preferred embodiment example of the invention with reference to the drawings. The drawings show.

DETAILED DESCRIPTION OF THE PRESENTLY PREFERRED EMBODIMENTS

Figure 1:
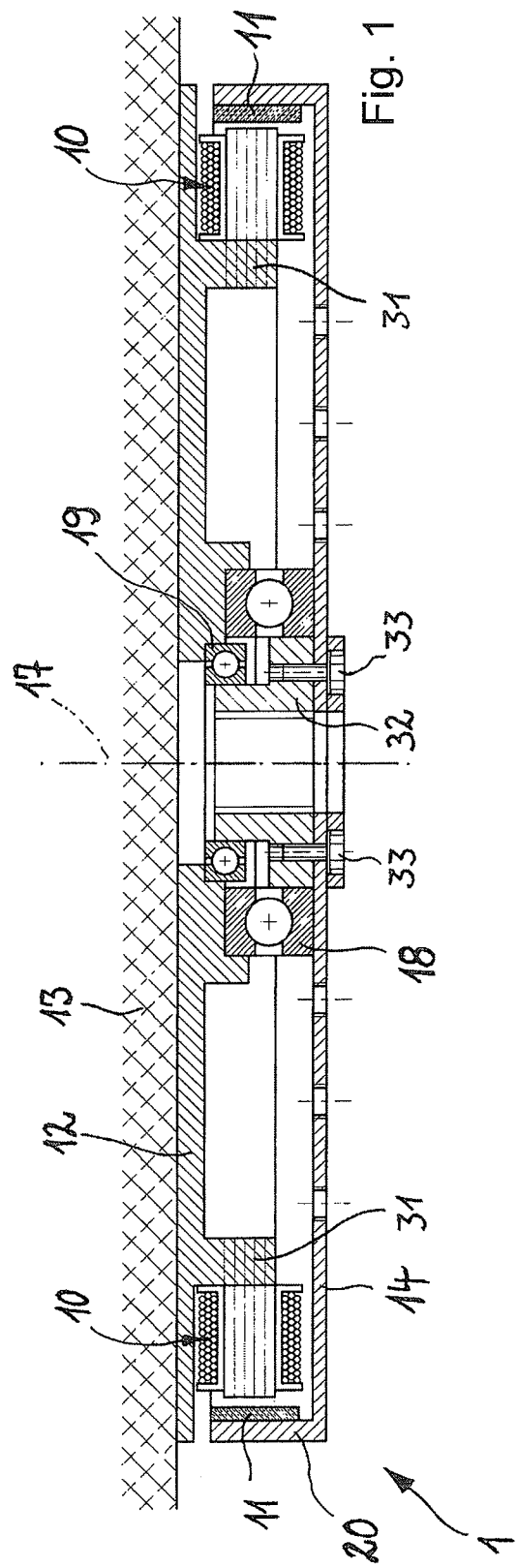
FIG. 1 is an example of a drive unit arranged at a structural component part, wherein the drive unit is constructed as an electronically commutated multipole motor.

FIG. 1 shows a cross-sectional view through an embodiment example of a drive unit in the form of a multipole motor 1. The drive unit can be used for driving a turnstile 15 of a revolving door 100.

The drive unit is arranged, for example, at the underside of a structural component part 13 and forms an electronically commutated multipole motor 1 with a quantity of coil elements 10 corresponding to a quantity of magnet elements 11. The coil elements 10 and the magnet elements 11 are arranged between a stator part 12 and a rotor part 14. The stator part 12 is disk-shaped, for example, and has individual projecting areas. The rotor part 14 is cup-shaped and has a circumferential cup surface portion 20. The outer circumference of the cup surface portion 20 corresponds to the terminating circumferential edge of the approximately disk-shaped stator part 12. As a result of the rotor part 14 being formed in a cup-shaped manner by the cup surface portion 20, an installation space is formed between the stator part 12 and the rotor part 14 in which the coil elements 10 and magnet elements 11 are arranged.

The coil elements 10 are arranged at a structural portion 31 of the stator part 12, and the structural portion 31 is formed as a portion extending circumferentially around the drive axis 17 and accordingly forms a circular path on which a plurality of coil elements 10 are received so as to be distributed around the circumference. Only two coil elements 10 are shown by way of example in the cross-sectional view.

The magnet elements 11 are received on the inner side in the cup surface portion 20, and a plurality of magnet elements 11 corresponding to the plurality of coil elements 10 are distributed over the circumference of the rotor part 14.

By the electric commutation of the coil elements 10, magnetic fields can be generated by making use of various energizing algorithms of the coil elements 10 on the circular path, which magnetic fields can migrate from coil element to coil element so that a driving torque is generated between the coil elements 10 and the magnet elements 11. By arranging the coil elements 10 at the stator part 12 and the magnet elements 11 at the rotor part 14, a torque is generated between the stator part 12 and the rotor part 14 by the electronic commutation of the coil elements 10.

An axial bearing 18 and a radial bearing 19 are provided for rotatably receiving the rotor part 14 at the stator part 12. Bearings 18 and 19 rotatably receive an insertion element 32 at the stator part 12, and the insertion element 32 is connected via screw elements 33 to the cup-shaped rotor part 14 in a torsionally rigid manner.

The electronically commutated multipole motor 1 has a flat, round base structure and has, for example, a ratio of height to diameter of about 1:10. Accordingly, the drive unit according to one embodiment of the invention is suitable in a particularly advantageous manner for driving the turnstile 15 of a revolving door 100, and the drive unit can be arranged between the turnstile 15 and a structural component part 13 at the top or also between the turnstile 15 and a structural component part 13 on the floor side without requiring substantial installation space as is shown in more detail in FIG. 2.

Figure 2:
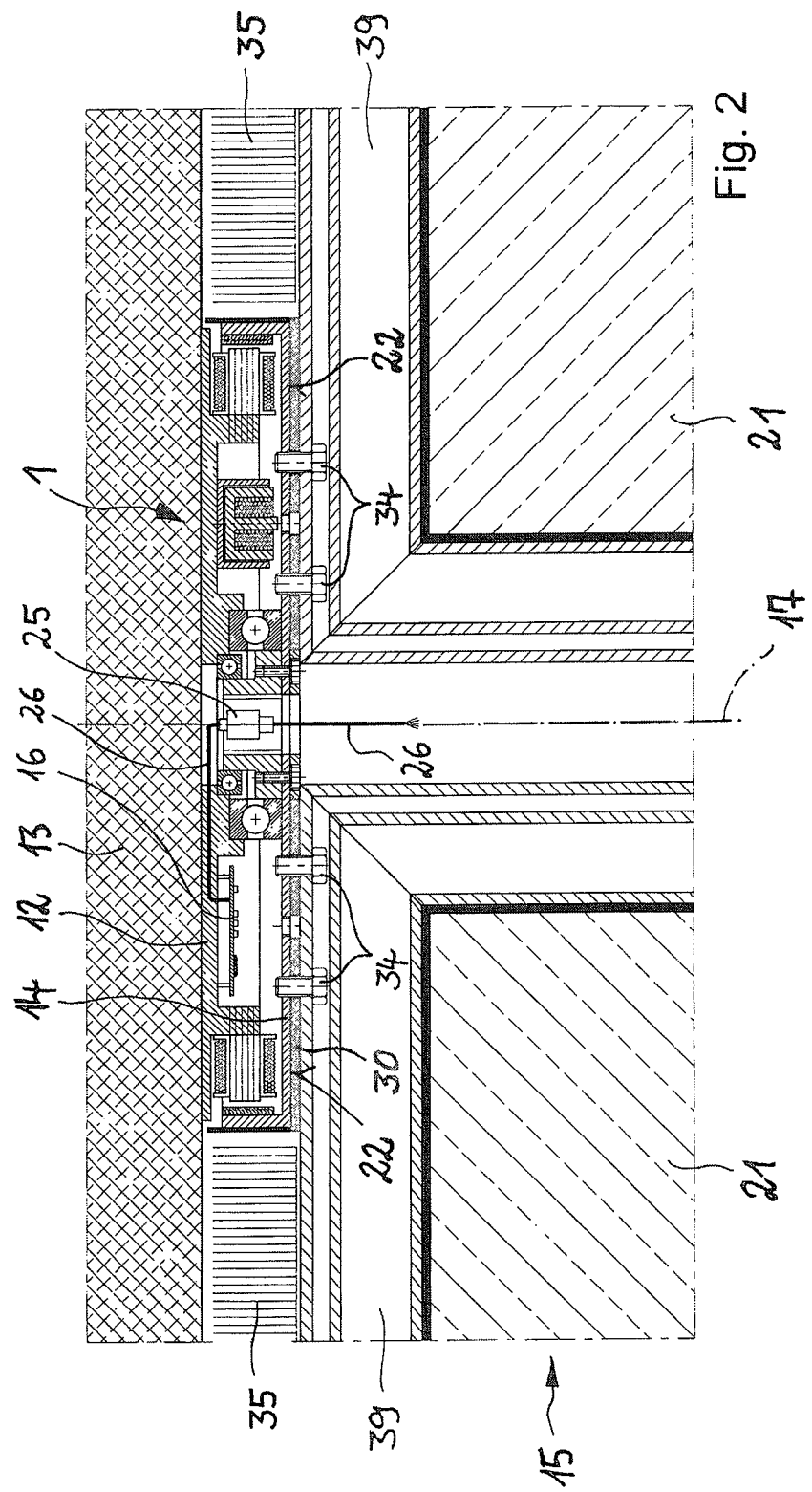
FIG. 2 is an example of a drive unit arranged at a structural component part, wherein a turnstile with a plurality of revolving wings is arranged at the rotor part of the multipole motor.

FIG. 2 shows an arrangement of a drive unit at a structural component part 13. A turnstile 15 of a revolving door 100 with a plurality of revolving wings 21 is arranged at the cup-shaped rotor part 14 in the drive unit. The rotor part 14 has an outer surface 22 facing in direction of the turnstile 15, and the revolving wings 21 are rigidly connected in each instance to the rotor part 14 by screw elements 34. A bezel element 30 is arranged between the rotor part 14 and the revolving wings 21.

The stator part 12 of the electronically commutated multipole motor 1 is connected to the structural component part 13 to be retained at the structural component part 13. The multipole motor 1 is arranged at the underside of the structural component part 13. The low height of the drive unit can be bridged by brush elements 35 arranged outside the multipole motor 1 between the revolving wings 21 and the structural component part 13. The brush elements 35 can be fastened to the revolving wings 21 and brush along the structural component part 13.

The revolving wings 21 have frame profiles 39 by which the revolving wings 21 are arranged at the rotor part 14 by screw elements 34, and a bezel element 30 which can serve as a decorative bezel is shown between the revolving wings 21 and the rotor part 14.

The embodiment example further shows a control unit 16 arranged in the installation space between the stator part 12 and the rotor part 14. Also shown is an electric lead 26 which is guided via a rotary feedthrough 25 out of the turnstile 15 to the control unit 16. The rotary feedthrough 25 allows a portion of the electric lead 26 rotating with the turnstile 15 to make electrical contact with a portion of the electric lead 26 that is stationary in the stator part 12. For example, the control unit 16 can be connected via the electric lead 26 to sensor elements which are received in the turnstile 15 and which consequently rotate along with the turnstile 15 around the drive axis 17.

Figure 3:
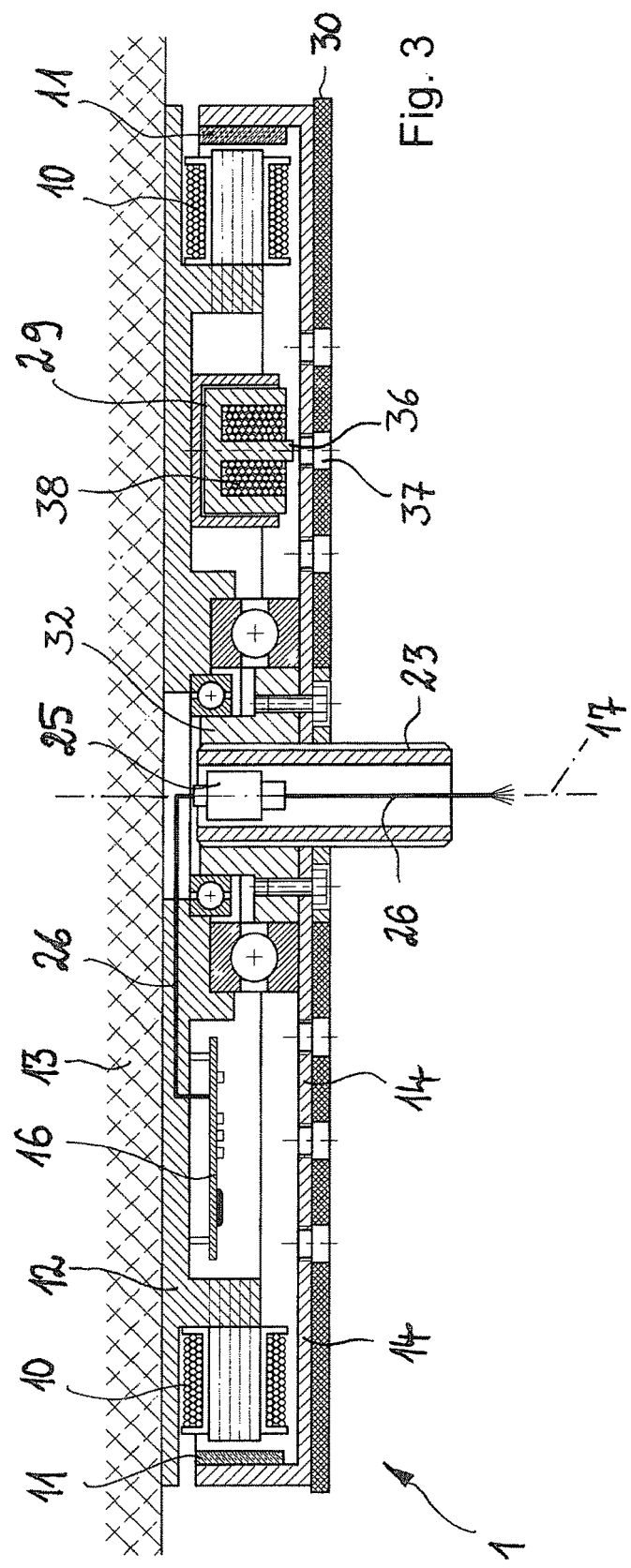
FIG. 3 is an example of a drive unit arranged at a structural component part, wherein the drive unit is constructed as an electronically commutated multipole motor.

FIG. 3 shows a further embodiment example of the drive unit in an arrangement at the underside of the structural component part 13. The drive unit has a stator part 12 in a substantially disk-shaped arrangement and has a rotor part 14 having a cup-shaped arrangement. A quantity of coil elements 10 is arranged at the stator part 12 and a quantity of magnet elements 11 is arranged at the rotor part 14. The magnet elements 11 are located on the outer side of the coil elements 10. A further bezel element 30 is arranged at the rotor part 14.

A control unit 16 which is connected to an electric lead 26 is located in the installation space between the stator part 12 and the rotor part 14, and the electric lead 26 is divided through a rotary feedthrough 25 into a stationary part and a part which rotates around the drive axis 17. The rotary feedthrough 25 is integrated in the multipole motor 1 and in an output shaft 23 according to the depicted embodiment example.

The output shaft 23 is connected to the insertion element 32 so as to be rigid with respect to rotation relative to it. The output shaft 23 is constructed, for example, as a splined shaft and a turnstile 15 can be connected to the output shaft 23 for rotationally driving around the drive axis 17.

A further blocking device 29 is shown in the installation space between the stator part 12 and the rotor part 14 and is received at the stator part 12. The blocking device 29 comprises a blocking element 36 that can execute a lifting movement when correspondingly activated in order to lock into a receiving opening 37 in the rotor part 14. To initiate the lifting movement of the blocking element 36, the blocking device 29 comprises a magnet coil 38, and when the latter is energized the blocking element 36 executes a lifting movement into the receiving opening 37. When the blocking device 29 is activated, the rotor part 14 is prevented from rotating relative to the stator part 12 around the drive axis 17 so that the turnstile 15 connected to the rotor part 14 is also blocked.

Figure 4:
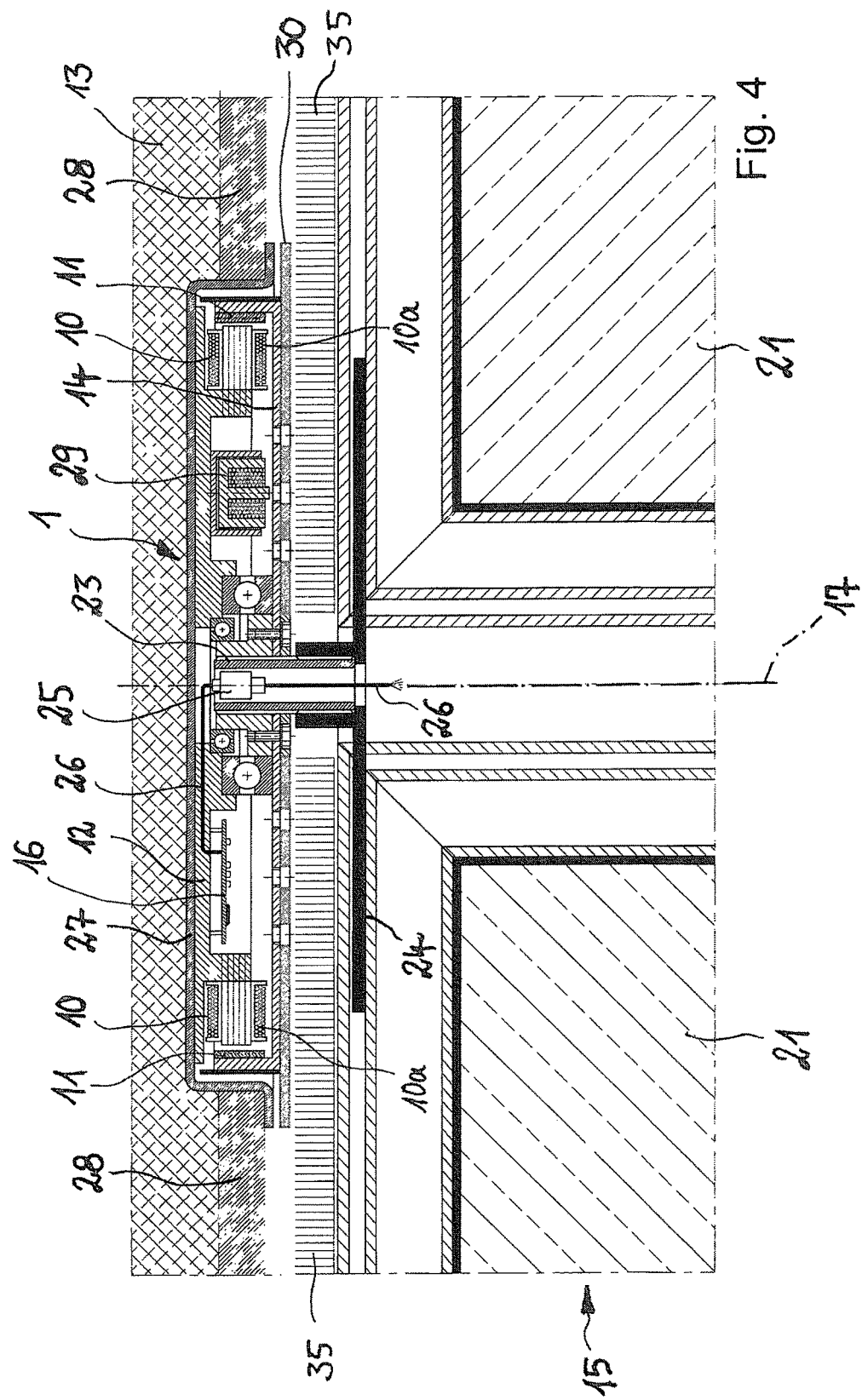
FIG. 4 is a drive unit arranged at a structural component part, wherein a turnstile with a quantity of revolving wings is arranged at the electronically commutated multipole motor by means of an adapter element.

The embodiment example of the drive unit allows the turnstile 15 of the revolving door 100 to be connected to the output shaft 23 as is shown in more detail in FIG. 4.

FIG. 4 shows the embodiment example of the drive unit in an arrangement at the structural component part 13 through a receiving vessel 27 which serves as a mounting adapter. The receiving vessel 27 is recessed by a certain amount into the structural component part 13; further, under ceiling elements 28 are held at the underside of the structural component part 13 by the receiving vessel 27.

To receive the multipole motor 1 in the receiving vessel 27, the stator part 12 is rigidly connected to the receiving vessel 27 and the rotor part 14 is connected to the output shaft 23 in a torsionally rigid manner.

Adjoining the output shaft 23 is an adapter element 24 which is constructed as an adapter cross, and the revolving wings 21 of the turnstile 15 are arranged at the arms of the adapter element 24. The turnstile 15 can have two, three, four or more revolving wings 21, for example. Also shown is a bezel element 30 which is arranged at the underside of the rotor part 14. Brush elements 35 are arranged at the upper edge of the revolving wings 21 and substantially bridge the vertical gap between the revolving wings 21 and the underside of the under ceiling elements 28.

If the wound bodies 10a of the coil elements 10 are energized, a torque is generated by magnetic interaction with the magnet elements 11 between the stator part 12 and the rotor part 14. By the torsionally rigid connection of the rotor part 14 to the turnstile 15 via the output shaft 23, the turnstile 15 can be set in rotation. In so doing, the operation of the drive unit can be controlled by the control unit 16, particularly also accompanied by the evaluation of signals sent to the control unit 16 via the electric lead 26 and the rotary feedthrough 25. The embodiment example of the drive unit likewise shows a blocking device 29 which can be activated in the same way as already described in connection with FIG. 3.

Figure 5:
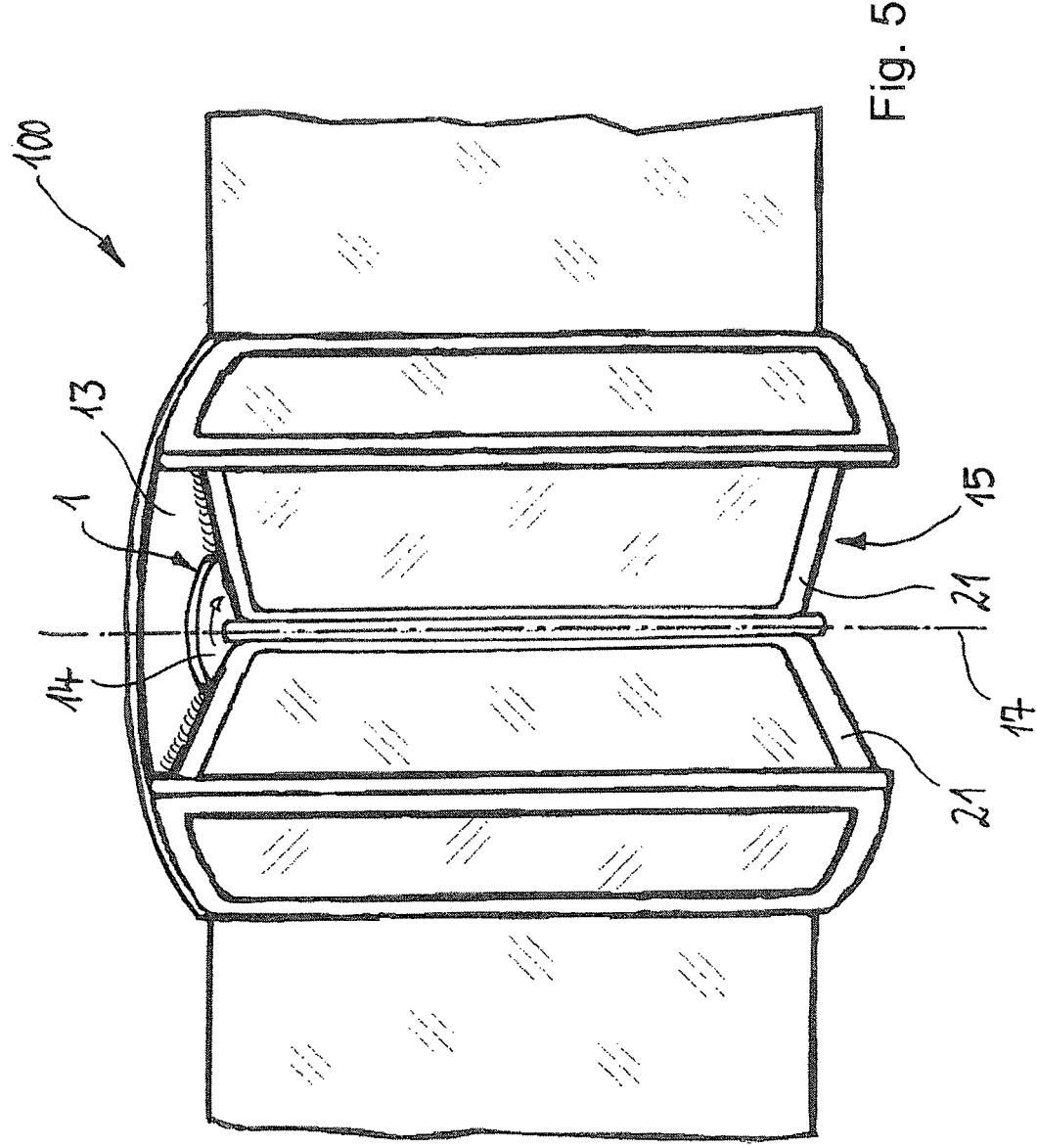
FIG. 5 is a perspective view of a revolving door with a drive unit according to the present invention.

FIG. 5 shows a view of a revolving door 100 with a turnstile 15, which can rotate around the drive axis 17. The revolving door 100 has a structural component part 13 that forms a ceiling element of the revolving door 100, and a drive unit, constructed as an electronically commutated multipole motor 1 according to one embodiment of the invention, is arranged at the underside of the structural component part 13. If the drive unit is activated, the visible part formed by the rotor part 14 can rotate, the rotor part 14 being connected to the revolving wings 21 of the turnstile 15. The diagram shows the very flat construction of the drive unit 1 in proportion to the revolving door 100. This drive unit 1 can be integrated between the turnstile 15 and the structural component part 13 without substantial constructional adaptation. In particular, the advantage achieved is that the structural component part 13 can be constructed in a very flat manner and facade elements, not shown in more detail, can adjoin at the upper side of the revolving door 100 without needing to provide an installation space for a drive unit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement of a revolving door (100) comprising:
    a drive unit comprising an electronically commutated multipole motor (1) having a flat base structure comprising: a plurality of coil elements (10);
    a plurality of magnet elements (11);
    a disk-shaped or cup-shaped stator part (12) configured to be arranged at a stationary structural component part (13); and
    a disk-shaped or cup-shaped rotor part (14) arranged in a plane-parallel with respect to the stator part (12) configured to be drivingly connected to a turnstile (15) of the revolving door (100),
    wherein the coil elements (10) and the magnet elements (11) are received in an area between the stator part (12) and the rotor part (14)
    wherein the multipole motor further includes a control unit received between the stator part and the rotor part; and
    a receiving vessel (27) configured to receive the multipole motor (1), wherein the drive unit is arranged at least partially recessed in the stationary structural component part (13).

2. The arrangement according to claim 1, wherein the flat base structure of the electronically commutated multipole motor (1) is substantially round and a ratio of a height of the flat base structure to a diameter of the flat base structure is at least 1:3.

3. The arrangement according to claim 1, wherein the rotor part (14) is bearing-mounted at the stator part (12) to be rotatable around a drive axis (17).

4. The arrangement according to claim 1, wherein the coil elements (10) are arranged on a radially inner side relative to the magnet elements (11).

5. The arrangement according to claim 1, wherein the coil elements (10) have wound bodies (10a) arranged at the stator part (12) that extend substantially radially between the stator part (12) and the rotor part (14).

6. The arrangement according to claim 1, wherein the coil elements (10) are arranged in a stationary manner at the stator part (12), and the rotor part (14) is cup shaped with a cup surface portion (20), the magnet elements (11) arranged on an inner side of the cup shaped rotor part.

7. The arrangement according to claim 1, wherein the rotor part (14) is configured to be connected to revolving wings (21) of the turnstile (15).

8. The arrangement according to claim 1, further comprising:
an output shaft (3) connected to the rotor part (14) in a torsionally rigid manner that extends in a drive axis (17); and
an adapter element (24) that connects the turnstile (15) to the output shaft (23).

9. The arrangement according to claim 1, wherein the multipole motor (1) has at least one rotary feedthrough (25) by which a control unit (16) is electrically connected to an element rotating with the rotor part (14) by at least one electric lead (26).

10. The arrangement according to claim 1, wherein the electronically commutated multipole motor (1) is arranged to be visible at an underside of the structural component part (13).

11. The arrangement according to claim 1, wherein the drive unit is integrated in the revolving door (100) on a ceiling side, and at least one decorative element (28) is retained at least partially by the receiving vessel (27) and is arranged at an underside of the structural component part (13).

12. A revolving door (100) having an arrangement of a drive unit according to claim 1.

13. The arrangement according to claim 2, wherein the ratio of the height of the flat base structure to a diameter of flat base structure is at least 1:8.

14. The arrangement according to claim 3, wherein at least one axial bearing (18) and/or at least one radial bearing (10) is arranged between the stator part (12) and the rotor part (14).

15. The arrangement according to claim 7, wherein the revolving wings (21) are connected directly to an outer surface (22) of the rotor part (14).

* * * * *